United States Patent
Biebach et al.

(10) Patent No.: US 11,459,075 B2
(45) Date of Patent: Oct. 4, 2022

(54) DRIVE FOR A BOAT WITH ELECTRIC MOTOR

(71) Applicant: Torqeedo GmbH, Gilching (DE)

(72) Inventors: Jens Biebach, Tutzing (DE); Frank Despineux, Wessling (DE); Philip Flores, Olching (DE)

(73) Assignee: Torqeedo GmbH, Gilching (DE)

( * ) Notice: Subject to any disclaimer, the term of this patent is extended or adjusted under 35 U.S.C. 154(b) by 46 days.

(21) Appl. No.: 17/072,900

(22) Filed: Oct. 16, 2020

(65) Prior Publication Data

US 2021/0114705 A1    Apr. 22, 2021

(30) Foreign Application Priority Data

Oct. 17, 2019 (DE) .................. 10 2019 128 105.9

(51) Int. Cl.

| | |
|---|---|
| B63H 21/17 | (2006.01) |
| B63H 1/14 | (2006.01) |
| B63H 21/38 | (2006.01) |
| B63H 23/02 | (2006.01) |
| B63H 23/32 | (2006.01) |
| B63H 23/34 | (2006.01) |

(52) U.S. Cl.
CPC ............... *B63H 21/17* (2013.01); *B63H 1/14* (2013.01); *B63H 21/383* (2013.01); *B63H 23/02* (2013.01); *B63H 23/321* (2013.01); *B63H 23/34* (2013.01); *B63H 2023/323* (2013.01)

(58) Field of Classification Search
CPC ........ B63H 21/17; B63H 21/383; B63H 1/14; B63H 23/02; B63H 23/321; B63H 23/34; B63H 2023/323
See application file for complete search history.

(56) References Cited

U.S. PATENT DOCUMENTS

| | | | | |
|---|---|---|---|---|
| 1,764,388 | A * | 6/1930 | Buchet | B63H 23/24 440/6 |
| RE18,118 | E * | 7/1931 | Pierce | F01P 3/202 440/51 |
| 2,466,525 | A * | 4/1949 | Harrison | F28D 7/1638 165/282 |
| 4,832,635 | A * | 5/1989 | McCormick | F01P 3/202 440/78 |
| 5,607,333 | A * | 3/1997 | Kvamsdal | B63H 21/383 440/88 M |

(Continued)

FOREIGN PATENT DOCUMENTS

| | | |
|---|---|---|
| DE | 877 254 C | 1/1955 |
| DE | 10 2013 214 082 A1 | 1/2015 |
| EP | 0 590 867 A1 | 4/1994 |

(Continued)

OTHER PUBLICATIONS

European Search Report issued in European application No. 20202402.2-1202 dated Mar. 19, 2021, (Twelve (12) pages).

(Continued)

*Primary Examiner* — Stephen P Avila
(74) *Attorney, Agent, or Firm* — Crowell & Moring LLP

(57) ABSTRACT

A drive for a boat includes a housing that is arranged underwater during operation, and that houses an electric motor that drives a propeller. The housing includes a cooling section that includes a coolant duct.

14 Claims, 3 Drawing Sheets

(56) References Cited

U.S. PATENT DOCUMENTS

2016/0126808 A1    5/2016  Nagao et al.
2017/0081007 A1*   3/2017  Kosso ................... H02K 21/00

FOREIGN PATENT DOCUMENTS

| EP | 1 901 418 A1 | 3/2008 |
| FR | 2 823 177 A1 | 10/2002 |
| WO | WO 2015/074937 A1 | 5/2015 |
| WO | WO 2016/074968 A1 | 5/2015 |

OTHER PUBLICATIONS

German Search Report issued in German application No. 10 2019 128 105.9 dated May 25, 2020, (Eight (8) pages).

* cited by examiner

DRIVE FOR A BOAT WITH ELECTRIC MOTOR

CROSS REFERENCE TO RELATED APPLICATIONS

This application claims priority under 35 U.S.C. § 119 from German Patent Application No. 10 2019 128 105.9, filed Oct. 17, 2019, the entire disclosure of which is herein expressly incorporated by reference.

BACKGROUND OF THE INVENTION

The present invention relates to a drive for a boat which has a housing arranged underwater during operation of the drive, in which housing an electric motor for driving a propeller is arranged. Typically, such a drive is provided in the form of an outboard drive or a pod drive for a boat, for example a motorboat or sailing boat.

Pod drives and outboard drives for boats are known, in which a housing that immerses into the water surrounding the boat during operation of the drive is provided, an electric motor being arranged in said housing, which motor is provided for driving the actual propeller that provides thrust in the water and thus ensures propulsion of the boat.

In the case of an outboard drive, the housing is connected via a shaft to the other components, in particular the components of the outboard drive arranged above the waterline. For example, at the upper end of the shaft, a control unit can be provided which, for example, can also include a tiller. In certain cases, a battery can also be provided at the upper end of the shaft to supply the electric motor provided at the lower end of the shaft in the housing with electric power. Such an outboard drive is known, for example in the form of the outboard motor marketed by the applicant under the trade name Travel 1003.

The drive can also be provided, for example, in the form of a pod drive, the pod drive having a connection base which is mounted on the underside of the hull of the boat to be propelled, the housing again being arranged at the lower end of the connection base and accommodating the electric motor, which is used to drive the propeller that then provides thrust in the water. Such a pod drive is known, for example, in the form of the pod drive marketed by the applicant under the trade name Cruise 2.0 FP.

The housing in which the electric motor is accommodated, and which is arranged underwater during operation of the drive and around which the water flows, is usually streamlined in design in order to have the lowest possible water resistance. This requirement competes with the need to accommodate an electric motor, which is as powerful as possible and therefore has a large diameter, in the housing.

Electrical and/or electronic components—for example, the power electronics and/or a commutator—are also usually provided in the housing of the drive which is arranged underwater during operation. Both the electric motor itself and also the electrical and/or electronic components generate waste heat during operation which can reduce the efficiency of the electric motor or the electrical and/or electronic components or can shorten the lifetime of said components of the drive. Insufficient cooling of the electronic components can also shorten their lifetime.

SUMMARY OF THE INVENTION

It is an object of the present invention to further improve a drive for a boat, which comprises an electric motor, in respect of its efficiency and/or its lifetime.

Accordingly, a drive for a boat is proposed with a housing arranged underwater during operation of said drive and with an electric motor accommodated in the housing for driving a propeller. A cooling section which is equipped with a coolant duct is provided in the housing.

Upon providing a cooling section with a coolant duct, heat can be dissipated from inside the housing, and in particular heat which arises due to operating the electric motor, via a coolant flowing through the coolant duct. In this way, it is possible to achieve improved dissipation of heat from the housing holding the electric motor, such that the efficiency of the electric motor and/or of electrical and/or electronic components accommodated in the housing can be improved. Furthermore, the lifetime of said components of the drive can also be improved in this way.

By dissipating the heat from inside the housing, it is possible to reduce the risk of the drive shutting down due to a thermal protective circuit, to better prevent overheating and thus to counteract destruction of the drive for thermal reasons.

Furthermore, it is also possible to prevent the onset of a self-protection of the motor by reducing power at increased temperatures, also known as de-rating, or at least shift the onset towards higher temperatures, so that the corresponding shutdown mechanisms or a power reduction do(es) not occur or only occur(s) later.

The coolant duct can communicate via a coolant inlet through the housing with water present in the vicinity of the housing and/or the coolant duct can communicate via a coolant outlet through the housing with water present in the vicinity of the housing. This makes it possible to use the water that is already present in the immediate vicinity of the housing as a coolant. No other means for supply and discharge are required for the coolant; the coolant flowing through the coolant duct is fed directly from the surrounding water. This allows water surrounding the housing to flow through the coolant duct during operation of the drive. Accordingly, the water already surrounding the housing of the drive can be used as a coolant.

The cooling section can be designed as an electronics carrier and can be in thermally conductive contact with electrical and/or electronic components. This enables a cooling and a dissipation of the heat generated by the electrical and/or electronic components. In this way, it is possible to increase the efficiency of the components and extend their lifetime.

The cooling section can also be designed as a bearing end plate for supporting a drive shaft of the electric motor. For example, a fixed bearing or a floating bearing (both bearings can be designed, for example, as roller or plain bearings) for rotatably supporting the drive shaft of the electric motor can be provided in the cooling section. This enables a dual function of the cooling section; on the one hand, it can provide a cooling function and on the other hand, it can provide a structural element for supporting the drive shaft.

The cooling section can also be provided to accommodate or hold or support a gearbox or gearbox parts so as to achieve cooling of the gearbox or gearbox parts in this manner. For example, the cooling section can be used as a ring gear of a planetary gear or as a bearing end plate of a gear shaft and accordingly dissipate heat from said components.

If the cooling section is designed as an electronics carrier and as a bearing end plate, the electrical and/or electronic components can preferably be provided on the surface of the cooling section which surface is arranged on a side directed away from a rotor of the electric motor. Accordingly, the waste heat generated by these electrical and/or electronic components can be dissipated at least partially via the coolant flowing in the coolant duct of the cooling section.

In at least one embodiment, the housing is made of a thermally insulating and/or vibration damping material, for example a plastic material or a composite material. In this embodiment, the cooling section has to be made of a material with good thermal conductivity to enable heat transmission from the components accommodated in the housing to the coolant. Accordingly, the heat transmission out of the housing is achieved to a large extent by the coolant only, such that heat dissipation via the surface of the housing is accordingly not necessary. The housing and its material can therefore be optimized, for example, for low noise emissions, so as to improve the range of uses of the drive in this way, for example as a trolling drive for fishing where low noise is important.

In at least one embodiment, the housing is made of a thermally conductive material so that heat transfer to the water surrounding the housing is possible via all other housing parts.

The cooling section is preferably formed integrally with the housing. In this way, a more precise construction of the drive can be achieved since positioning of the cooling section is no longer subject to installation tolerances. This is particularly advantageous if the cooling section is also designed as a bearing end plate and/or as an electronics carrier. In this way, it is also possible to achieve particularly cost-efficient production of the housing and a sturdy construction of the cooling section and the housing, simultaneously.

Due to the integral construction, the seals necessary for a multi-part construction, for example between the cooling section and the housing, can also be omitted. The integral construction also ensures that the inside of the housing is still sealed against the ingress of water so that the integral construction provides safe operation of the drive with simultaneous cooling.

In at least one embodiment, the housing has, in the region of the coolant inlet, a contour providing an overpressure, preferably a step providing a dynamic pressure or a tear-off edge creating a vortex, such that during movement of the housing through water, an overpressure is generated in the region of the coolant inlet. As a result, the water flow around the housing, which is present in any case during operation of the drive, can be used so that water simultaneously flows through the coolant duct. Accordingly, separate pump devices for pumping the water through the coolant duct are not necessary. Only the movement of the housing through the water enables a flow through the coolant duct. In this way, heat can be efficiently dissipated from inside the housing and in particular from the cooling section to the water surrounding the housing. At the same time, this is also passive cooling as there is no need to pump the water as a coolant.

In at least one embodiment, the housing has, in the region of the coolant outlet, a contour providing a negative pressure, preferably a constriction providing a negative pressure, such that during movement of the housing through water, a negative pressure is generated in the region of the coolant outlet. As a result, the water flow around the housing, which is present in any case during operation of the drive, can be used so that water simultaneously flows through the coolant duct. Accordingly, separate pump devices for pumping the water through the coolant duct are not necessary. Only the movement of the housing through the water enables a flow through the coolant duct. In this way, heat can be efficiently dissipated from inside the housing and in particular from the cooling section to the water surrounding the housing. At the same time, this is also passive cooling as there is no need to pump the water as a coolant.

It is possible to achieve a particularly efficient and powerful, but at the same time passive, transport of surrounding water through the coolant duct by simultaneously forming a contour providing an overpressure in the region of the coolant inlet and a constriction providing a negative pressure in the region of the coolant outlet.

A plurality of coolant ducts is preferably provided in the cooling section which communicate with the surroundings of the housing either via a central coolant inlet and/or a central coolant outlet, or via a plurality of coolant inlets and/or a plurality of coolant outlets. In this way, it is possible to achieve efficient dissipation of heat from the interior of the housing and in particular from the cooling section, and yet it is possible to achieve a homogeneous distribution of the heat dissipation over the surface of the cooling section if the geometry of the coolant ducts is adapted accordingly.

By designing the coolant inlets and coolant outlets in such a manner that a higher pressure is present at the coolant inlet than at the coolant outlet, it is possible while the coolant, typically water, is flowing around the housing to ensure that said coolant flows through the coolant duct without the need for additional pumping of the coolant. Accordingly, any further mechanical components can be omitted and a flow through the coolant duct is achieved merely by moving the housing relative to the surrounding medium.

In at least one embodiment, the coolant duct is preferably arranged obliquely to the usual forward direction of travel such that the relative speed of travel through the water results in an automatic flow through the coolant duct.

In at least one embodiment, the coolant duct has an inlet directed forwards in the forward direction of travel and an outlet directed backwards. The inlet and the outlet can be arranged at different levels in the housing—for example the inlet on the front at the top and the outlet on the back at the bottom—such that dynamic pressure and incident flow create a flow through the coolant duct.

In at least one embodiment the cooling section and the housing are made of a material with good thermal conductivity, for example a metallic material, in such a manner that, in addition to transferring heat to the coolant, heat transfer via the material contact or the material between the cooling section and the outside of the housing can be used for heat dissipation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
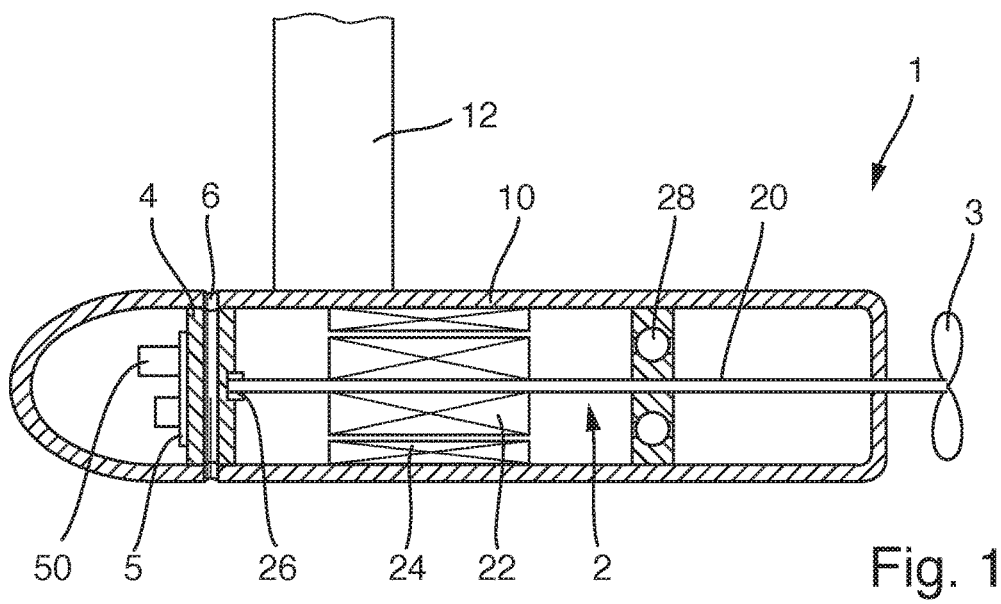
FIG. 1 shows a schematic lateral sectional view of a drive according to aspects of at least one embodiment.

The figures illustrate aspects of the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one embodiment of the invention with the understanding that the present disclosure is to be considered as an exemplification of the principles of the present invention, and is not intended to limit the broad aspects of the present invention to any embodiment illustrated. It will therefore be understood that what is illustrated is set forth for the purposes of example, and should not be taken as a limitation on the scope of the present invention.

In the following detailed description and corresponding figures, numerous specific details are set forth in order to provide a thorough understanding of the present invention. However, it should be appreciated that the invention may be practiced without such specific details. Additionally, for brevity sake well-known methods, procedures, components, and circuits have not been described in detail. Identical, similar or equivalent elements are also provided with the same reference numbers in the different figures and repeated description of these elements is partly omitted to avoid redundancies.

FIG. 1 shows a schematic sectional view of a drive 1 for a boat (not shown). The drive 1 comprises a housing 10 in which a schematically indicated electric motor 2 is accommodated. The housing 10 can be attached to the boat via a connection base 12.

The housing 10 can be composed of a plurality of parts or can be provided substantially only in the form of a sleeve with cover. The housing 10 is preferably streamlined in shape to reduce the flow resistance of the drive 1.

The connection base 12, for example, can be either the shaft of an outboard drive or a connection base of a pod drive.

In the case of an outboard drive, the connection base 12 in the form of a shaft could be held pivotably, for example, in a known manner on the transom of the boot. In the case of a pod drive, the connection base 12 could be attached to the hull on the underside of said hull below the waterline of the boat.

The electric motor 2 indicated schematically has a motor shaft 20, a rotor 22 and a stator 24. The drive shaft 20 is rotatably held in a fixed bearing 26 and a floating bearing 28, the drive shaft 20, in the embodiment shown, being rigidly connected to a propeller 3. When rotating in the water, the propeller 3 provides the thrust of the drive 1, which thus ensures propulsion of the boat.

In at least one embodiment, a gearbox also not shown here can be interposed between the drive shaft 20 and the propeller 3 or a separate propeller shaft to provide a gear reduction, for example.

In at least one embodiment, the fixed bearing 26 of the electric motor 2 is accommodated in a cooling section 4 in the housing 10 and is held by said cooling section. The cooling section 4 accordingly acts as a bearing end plate.

The cooling section 4 can be fixedly arranged inside the housing 10. Connection of the cooling section 4 to the housing 10 can be achieved, for example, in that the cooling section 4 is glued or welded to the housing 10, is accommodated therein in a form-fitting manner or is screwed thereto.

Figure 2:
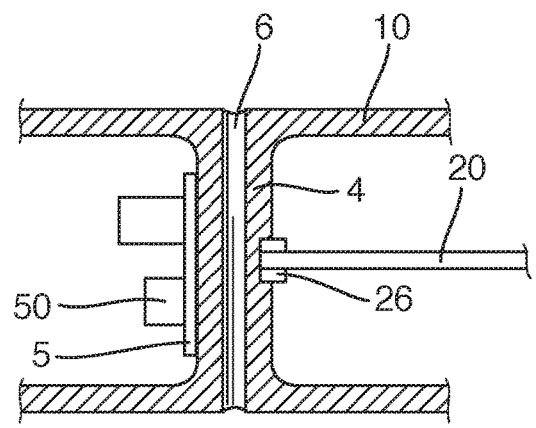
FIG. 2 shows a schematic cutaway detailed view of a drive according to aspects of at least one embodiment.

In at least one embodiment, which is shown schematically in FIG. 2, the cooling section 4 can also be formed integrally with the housing 10 or can be a part of the housing 10.

A printed circuit board 5 on which electrical and/or electronic components 50 are arranged can be provided on the side of the cooling section 4 which is remote from the electric motor 2 or from the rotor 22 of the electric motor 2. The electrical and/or electronic components 50 and/or the printed circuit board 5 are connected thermoconductively to the cooling section 4 such that the waste heat being released by the electrical and/or electronic components can flow at least partially to the cooling section 4. The electrical and/or electronic components 50 can be used to control the electric motor 2.

A coolant duct 6 is provided in the cooling section 4 in order to at least partially dissipate the heat to the surroundings, which heat can at least partially flow to the cooling section 4 and which arises in the electrical and/or electronic components 50 or in the printed circuit board 5. Alternatively, or additionally, the coolant duct 6 provided in the cooling section 4 can at least partially dissipate the heat, which is generated by the electric motor 2.

In the embodiment shown in FIG. 1, the coolant duct 6 also passes through the wall of the housing 10 in such a manner that the coolant duct 6 provided in the cooling section 4 can communicate with the surroundings outside the housing 10 or with the outside of the drive 1. In other words, coolant can enter the coolant duct 6 from the outside of the housing 10 and leave said coolant duct to return to the outside of the housing 10.

During operation of the drive 1, the housing 10 at least is immersed in the water so that the propeller 3 is also immersed in the water, so as in this way to provide the thrust for the boat.

Accordingly, the coolant duct 6 is thus also directly connected to the water surrounding the housing 10 of the drive 1 such that water can flow through the coolant duct 6 and is accordingly available to dissipate heat from inside the housing 10.

The water present in the coolant duct 6 of the cooling section 4 of the drive 1 can accordingly transfer the waste heat, arising in the housing 10 due to the electric motor 2 and/or the electrical and/or electronic components 50, at least partially to the coolant, in this case the water, thus enabling efficient dissipation of the heat. This allows the heat to be discharged from the drive 1, as a result of which the efficiency of the electric motor 2 and/or the electrical and/or electronic components 50 can be increased and/or the lifetime of said components of the drive 1 can be increased.

The material of the housing 10 and the material of the cooling section 4 can either be selected to be identical or different materials can be used.

To enable good heat transfer between the interior of the housing 10 and in particular between the electric motor 2 and/or the electronic and/or electrical components 50 and the coolant present in the coolant duct 6, the electronics carrier 4 is preferably made of a material with good thermal conductivity, for example a metal material.

As, in the embodiment shown in FIG. 1, heat dissipation is achieved via the coolant present in the coolant duct 6, for example by the water surrounding the housing 10, it is not necessarily required that heat dissipation happens via the surface of the housing 10. Accordingly, the housing 10 can be made of a less thermally conductive material, for example a plastic material or a composite material, such that the housing 10, for example, can be manufactured at particularly low costs and/or with a particularly low weight and/or a particularly low tendency to corrode and/or with a specified acoustic damping, without a need to consider the thermal properties of the material of the housing 10. However, heat can still be dissipated from the housing 10 via the coolant, simultaneously.

In the embodiment shown in FIG. 2, the housing 10 and the cooling section 4 are formed integrally so that both the electronics carrier 4 and the housing 10, or a portion of the housing 10 respectively, are made of the same material which preferably has good thermal conductivity. A particularly reliable support of the drive shaft 20 of the electric motor 2 can be achieved due to the integral design of the housing 10 with the cooling section 4, since it is possible to avoid manufacturing tolerances within the assembly of the cooling section 4 and the housing 10.

Also, in at least one embodiment, a coolant duct 6 may be provided in the cooling section 4, enabling water flow from the vicinity of the housing 10, accordingly.

Figure 3:
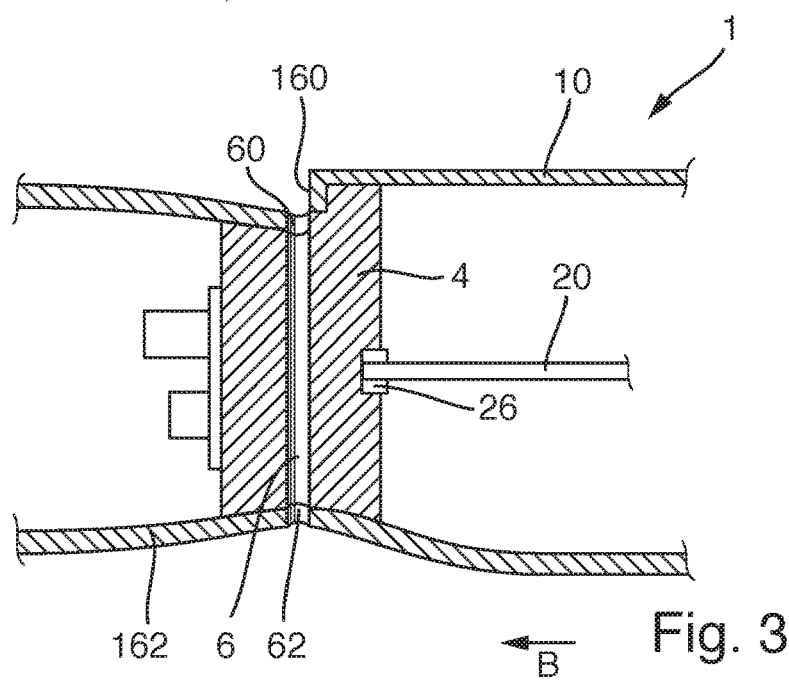
FIG. 3 shows a further schematic cutaway detailed view of a drive according to aspects of at least one embodiment.

According to at least one embodiment, FIG. 3 shows a particular design of a coolant inlet 60 and the coolant outlet 62 of the coolant duct 6 in the housing 10.

Accordingly, the coolant duct 6 comprises a coolant inlet 60 and a coolant outlet 62. In the region of the coolant inlet 60, the contour of the housing 10 has a step 160, which acts as a weir, in direction of motion B of the drive 1 downstream of the coolant inlet 60. If the drive 1 moves through the water in the direction of motion B, a dynamic pressure of the water flowing around the housing 10 is generated at the step 160, which ensures a slight overpressure in the region of the coolant inlet 60. Due to the slight overpressure in the region of the coolant inlet 60, which occurs due to the dynamic pressure at the step 160, the water surrounding the housing 10 flows into the coolant duct 6.

In the region of the coolant outlet 62, however, a constriction 162 is provided in direction of motion B upstream of the coolant outlet 62, which is continuously guided back to the original outer contour of the housing 10 in direction of motion B downstream of the coolant outlet 62 such that accordingly there is not an accumulation but rather an acceleration of the water flowing past. In this way, a slight negative pressure is created in the region of the coolant outlet 62 during movement of the drive 1 in the direction of motion B by the water flowing around it.

Due to the shape of the coolant inlet 60, shown schematically in FIG. 3, and the contour of the housing 10 surrounding it and/or the shape of the coolant outlet 62 shown and the contour of the housing 10 surrounding it, accordingly during a movement of the drive 1 through the water along the direction of motion B, a slight overpressure arises at the coolant inlet 60 and/or a slight negative pressure arises at the coolant outlet 62.

The movement of the drive 1 through the water in direction of motion B therefore creates pressure conditions which ensure that water from the surroundings is transported through the coolant duct 6.

Within a certain pressure window, the pressures arising at the corresponding contours of the housing 10 depend on the flow velocity of the water along the housing 10 such that correspondingly, with a higher flow velocity of the water and therefore typically also a higher load of the electric motor 2 and of the electronic and/or electrical components 50, a higher water flow also flows through the coolant duct 6. Thus, at least within a certain speed range, the cooling capacity provided by the water flowing through adapts to the speed of movement of the drive 1 relative to the surrounding water.

Only one coolant duct 6 is shown in the embodiments illustrated. However, two or more coolant ducts 6 can also pass through the cooling section 4 to increase the cooling capacity accordingly or to distribute the cooling capacity more evenly over the surface of the cooling section 4.

Figure 4:
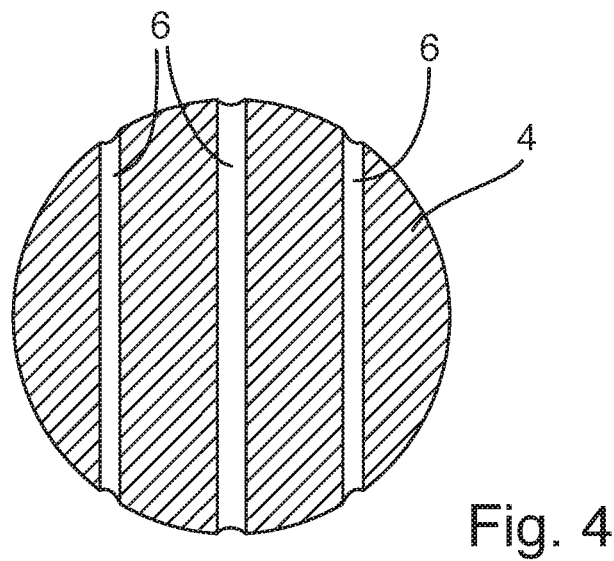
FIG. 4 shows a schematic sectional view of a cooling section, according to aspects of at least one embodiment, wherein three coolant ducts are visible.

FIG. 4 schematically shows a sectional view through a cooling section 4 in which accordingly three coolant ducts 6 are provided through which water can flow. In this way, the water volume flowing through the cooling section 4 and thus the cooling capacity can be increased and/or the cross-section of the individual coolant ducts 6 can be reduced compared to a cooling section 4 having a smaller number of coolant ducts 6, as a result of which the thickness of the cooling section 4 and thus its weight can also be reduced and/or the heat transmission can be adapted more evenly to the surface of the cooling section 4.

Figure 5:
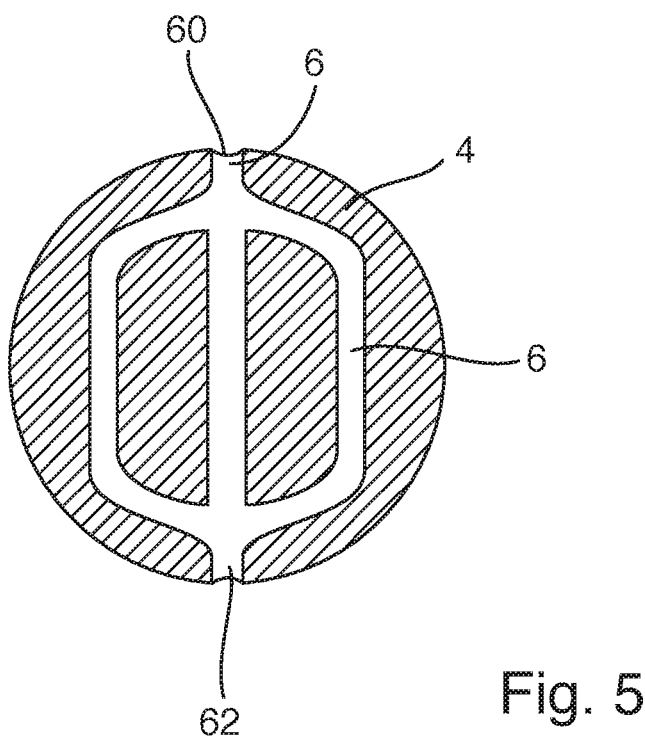
FIG. 5 shows a further schematic sectional view of a cooling section, according to aspects of at least one embodiment, in which a further arrangement of the coolant ducts is selected.

FIG. 5 schematically shows at least one embodiment in which the coolant duct 6 in the cooling section 4 branches within said cooling section 4 to achieve improved distribution of the cooling capacity over the surface of the cooling section 4. This means that the number of coolant inlets 60 and coolant outlets 62 can be smaller than the number of coolant channels 6 within the cooling section 4, so as to improve the hydrodynamic properties of the drive 1.

It is understood that the characteristics of the coolant duct 6 described herein with regard to the cooling section 4, in which the fixed bearing 26 is arranged and on which the electrical and/or electronic components 50 for controlling the electric motor 2 are arranged, can also be applied to a cooling section 4 configured as an electronics carrier inside the housing 10 of the drive 1. For example, a cooling section 4 configured as an electronics carrier can also be provided, in which cooling section, for example, the floating bearing 28 is also held, and which is equipped with a coolant duct according to the description referred to above. Two cooling sections or a plurality of cooling sections can also be equipped with coolant ducts in the form described above.

Figure 6:
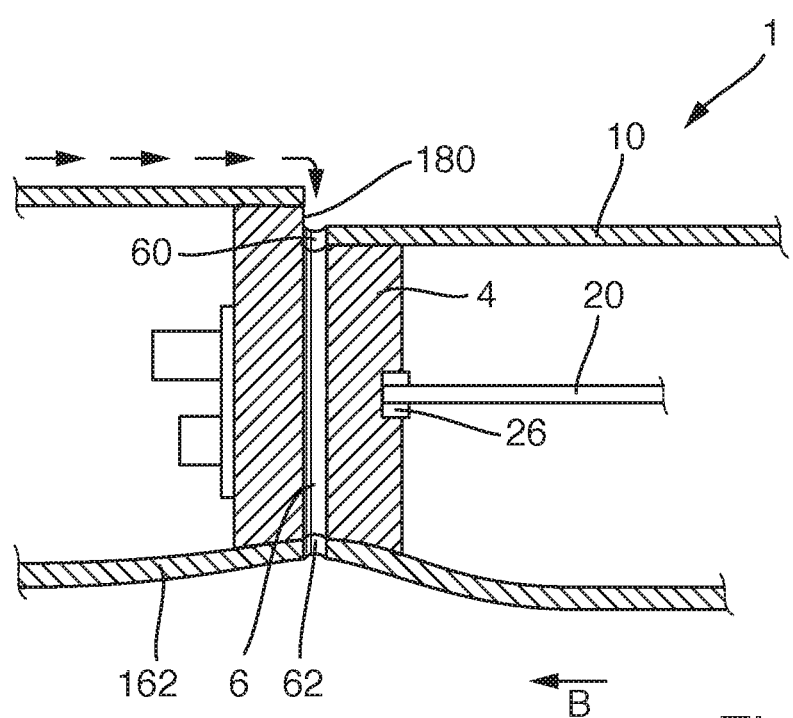
FIG. 6 shows a further schematic cutaway detailed view of a drive according to aspects of at least one embodiment.

In at least one embodiment, FIG. 6 shows a particular design of a coolant inlet 60 and the coolant outlet 62 of the coolant duct 6 in the housing 10.

Accordingly, the coolant duct 6 comprises a coolant inlet 60 and a coolant outlet 62. In the region of the coolant inlet 60, the contour of the housing 10 comprises in direction of motion B of the drive 1 upstream of the coolant inlet 60 a tear-off edge 180, downstream of which a vortex occurs. The resulting flow structure approximately corresponds to an "eddy" in a river. If the drive 1 moves through the water in the direction of motion B, a vortex of the water flowing around the housing 10 is generated downstream of the tear-off edge 180 which ensures a slight overpressure in the region of the coolant inlet 60. The water surrounding the housing 10 flows into the coolant duct 6 due to the slight overpressure in the region of the coolant inlet 60, which occurs due to the vortex at the tear-off edge 180.

In the region of the coolant outlet 62, however, a constriction 162 is provided in direction of motion B upstream of the coolant outlet 62, which is continuously guided back to the original outer contour of the housing 10 in direction of motion B downstream of the coolant outlet 62 such that accordingly there is not an accumulation but rather an acceleration of the water flowing past. In this way, a slight negative pressure is created in the region of the coolant outlet 62 during movement of the drive 1 in the direction of motion B by the water flowing around it.

Accordingly, during a movement of the drive 1 through the water along the direction of motion B, a slight overpressure arises at the coolant inlet 60 caused by the vortex due to the configuration of the coolant inlet 60 and the contour of the housing 10 surrounding it, which is schematically shown in FIG. 6. Alternatively, or additionally, during a movement of the drive 1 through the water along the direction of motion B, a slight negative pressure arises at the coolant outlet 62 due to the configuration of the coolant outlet 62 and the contour of the housing 10 surrounding it, which is also schematically shown in FIG. 6.

The movement of the drive 1 through the water in direction of motion B therefore creates pressure conditions which ensure that water from the surroundings is transported through the coolant duct 6.

Within a certain pressure window, the pressures arising at the corresponding contours of the housing 10 depend on the flow velocity of the water along the housing 10 such that correspondingly, with a higher flow velocity of the water and therefore typically also a higher load of the electric motor 2 and of the electronic and/or electrical components 50, a higher water flow flows through the coolant duct 6. Thus, at least within a certain speed range, the cooling capacity provided by the water flowing through adapts to the speed of movement of the drive 1 relative to the surrounding water.

While only one coolant duct 6 is shown, two or more coolant ducts 6 can also pass through the cooling section 4 to increase the cooling capacity accordingly or to distribute the cooling capacity over the surface of the cooling section 4.

The embodiments described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the disclosed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the disclosure and equivalents thereof.

LIST OF REFERENCE NUMBERS

1 Drive
10 Housing
12 Connection base
2 Electric motor
20 Drive shaft
22 Rotor
24 Stator
26 Fixed bearing
28 Floating bearing
3 Propeller
4 Cooling section
5 Printed circuit board
50 Electrical and/or electronic components
6 Coolant duct
60 Coolant inlet
62 Coolant outlet
160 Step
162 Constriction
180 Tear-off edge
B Direction of movement

The invention claimed is:

1. A drive for a boat, comprising:
a housing configured to be underwater during operation of the drive, the housing having a cooling section with a coolant duct; and
an electric motor accommodated in the housing for driving a propeller,
wherein the coolant duct communicates with water in the vicinity of the housing via a coolant outlet through the housing, and
wherein the housing has, in the region of the coolant outlet, a contour providing a negative pressure, such that during movement of the housing through water, a negative pressure is generated in the region of the coolant outlet.

2. The drive of claim 1, wherein the coolant duct communicates with water in the vicinity of the housing via at least one of: a coolant inlet through the housing, and a coolant outlet through the housing.

3. The drive of claim 1, characterized in that the cooling section is configured as an electronics carrier having electrical and/or electronic components in thermally conductive contact therewith.

4. The drive of claim 1, wherein the cooling section is configured as a bearing end plate for supporting a drive shaft of the electric motor.

5. The drive of claim 4, wherein the cooling section includes:
- a fixed bearing or a floating bearing that rotatably supports the drive shaft of the electric motor, the fixed bearing and the floating bearing being roller bearings or plain bearings.

6. The drive of claim 1, wherein the cooling section is configured to receive, hold or otherwise support a gearbox or gearbox parts, and wherein the cooling section is configured as a ring gear of a planetary gear or as a bearing end plate of a gear shaft.

7. The drive of claim 1, wherein the housing is made of a heat-insulating and/or vibration damping material.

8. The drive of claim 1, wherein the cooling section is formed integrally with the housing.

9. The drive of claim 1,
- wherein the coolant duct communicates with water in the vicinity of the housing via a coolant inlet through the housing, and
- wherein the housing has, in the region of the coolant inlet, a contour providing an overpressure, such that during movement of the housing through water, an overpressure is generated in the region of the coolant inlet.

10. The drive of claim 9, wherein the contour is a step providing a dynamic pressure or a tear-off edge causing a vortex.

11. The drive of claim 1, wherein the contour is a constriction providing a negative pressure.

12. The drive of claim 1, wherein the coolant duct is arranged obliquely with respect to an intended forward direction of travel.

13. The drive of claim 1, wherein the coolant duct has an inlet directed forwards in the forward direction of travel and an outlet directed backwards, wherein the inlet and the outlet are preferably arranged at different levels in the housing.

14. A method for cooling a drive of a boat, the method comprising:
- providing a housing for the drive that has a coolant duct, wherein the coolant duct communicates with water in the vicinity of the housing via a coolant outlet through the housing;
- arranging the housing underwater; and
- operating the drive so as to cause water to flow through the coolant duct due to movement of the housing through the water, wherein the housing has, in the region of the coolant outlet, a contour providing a negative pressure, such that during movement of the housing through water, a negative pressure is generated in the region of the coolant outlet.

* * * * *